Dec. 8, 1964 P. A. LEPELLETIER 3,160,003
TORQUE MEASUREMENT IN HYDROKINETIC TRANSMISSION DEVICES
Filed June 20, 1962 7 Sheets-Sheet 5
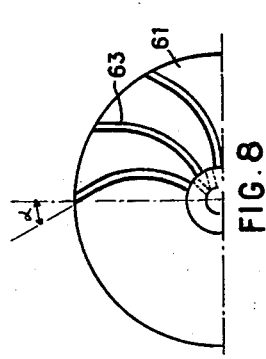
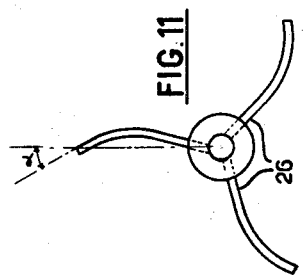
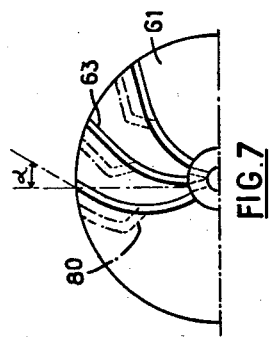
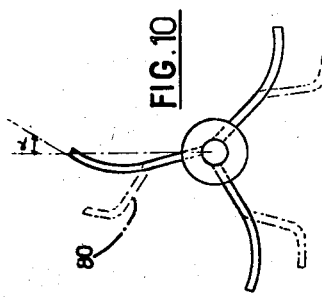
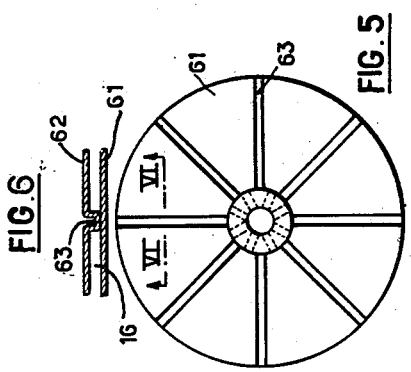
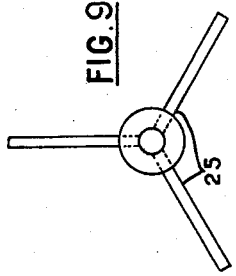
INVENTOR
PIERRE ANDRÉ LEPELLETIER
By Irwin S. Thompson
ATTY.

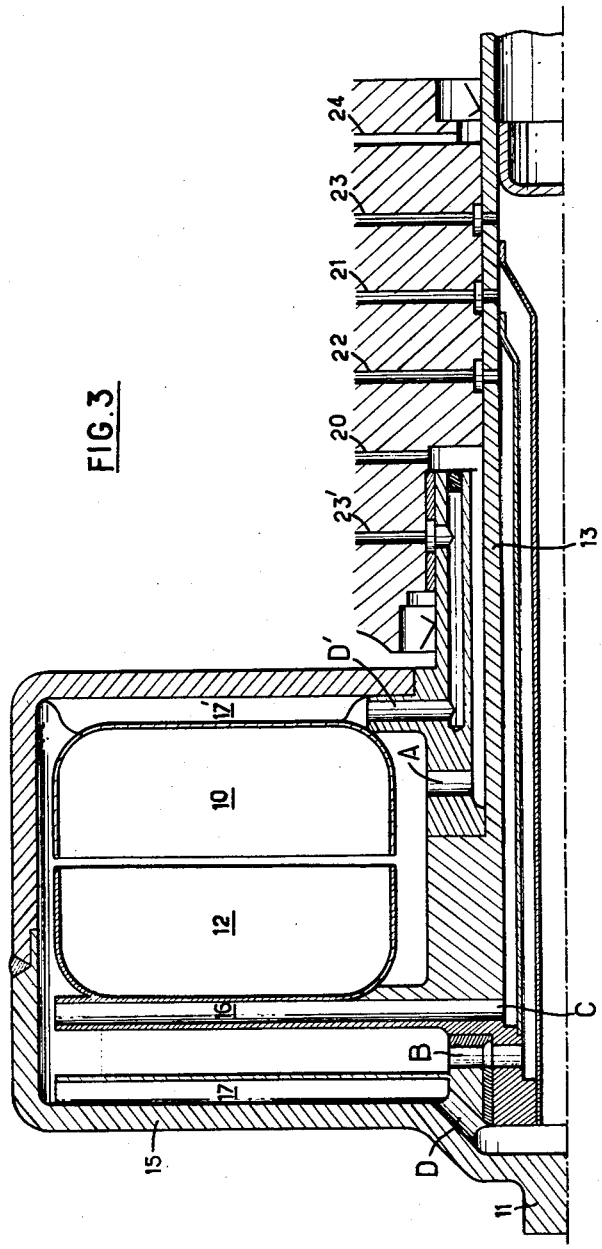

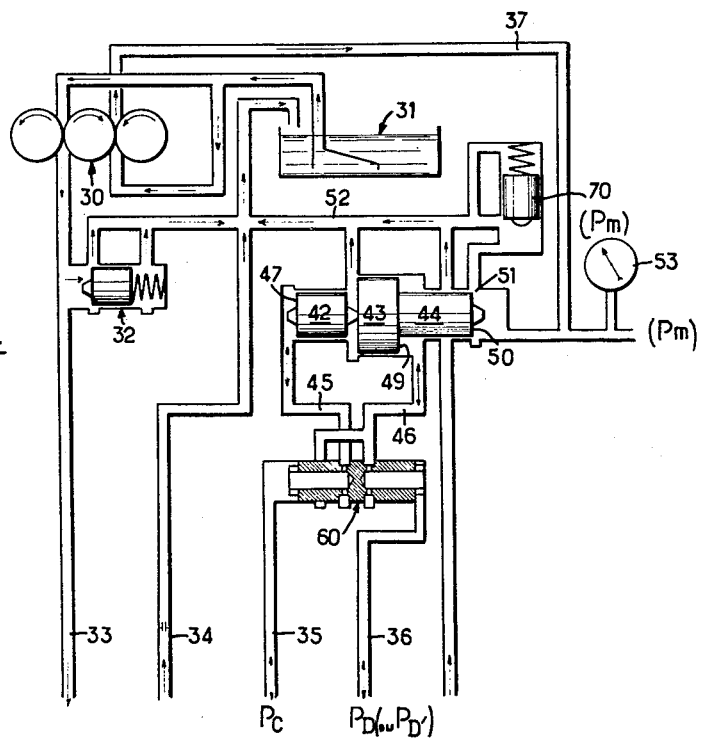

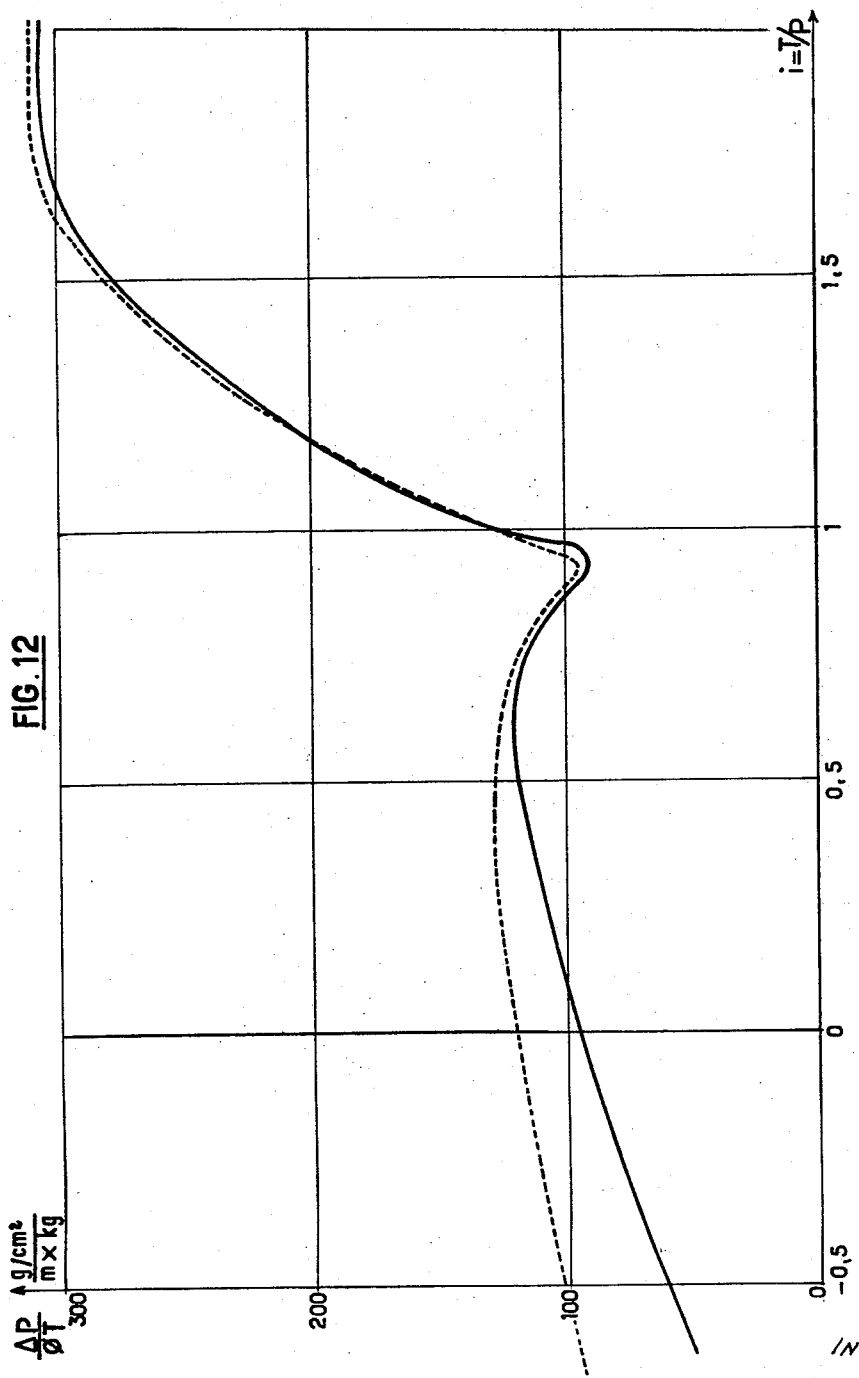

United States Patent Office 3,160,003
Patented Dec. 8, 1964

3,160,003
TORQUE MEASUREMENT IN HYDROKINETIC TRANSMISSION DEVICES
Pierre André Lepelletier, Chatou, France, assignor to Societe Anonyme Francaise du Ferodo, Paris, France, a corporation of France
Filed June 20, 1962, Ser. No. 203,913
Claims priority, application France July 7, 1961
18 Claims. (Cl. 73—136)

The present invention has for its object a device for measuring the load applied to the output of a hydrokinetic transmission apparatus, comprising a pump coupled to a driving shaft and also a turbine coupled to a driven shaft, the said device being characterized in that it comprises a chamber provided in its central portion with an orifice for introducing a hydraulic fluid under pressure, and which comprises two centrifugal members having speeds respectively equal or proportional, with the same ratio of proportionality, to the speeds of the driving shaft and the driven shaft, at least one passage connected to the first centrifugal member and at least one passage connected to the second centrifugal member, each of these passages extending between the central portion and the periphery of the said chamber, together with means for measuring the difference between the pressures derived respectively from the internal extremities of the said passages connected to the centrifugal members.

The difference in pressure thus measured provides an indication of the load applied to the output of the transmission apparatus.

According to a further particular feature, each of the two indicator pressures is extracted from the inner extremity of a passage in which the linear speed of propagation of the fluid, and also the loss of pressure which may result therefrom, are small or nil.

In accordance with one embodiment applicable to a hydro-kinetic transmission apparatus in which the pump outlet and the turbine inlet are located in the vicinity of the periphery of the apparatus, the chamber is constituted by the actual casing of the apparatus, the centrifugal member rotating with the driving shaft is constituted by the pump itself of the apparatus, the centrifugal member rotating with the driven shaft is formed by the turbine of the apparatus, while the pressure-collecting passages are both independent of the active circuit of the hydro-kinetic transmission apparatus.

The pressure-collecting passages are preferably both independent of any fluid circulation circuit in the hydrokinetic transmission apparatus, that is to say the flow-rate of fluid and the loss of pressure in these passages are nil.

It is however also possible to provide that one and/or the other of these passages can form part of the renewal circuit of the hydraulic fluid in the apparatus. A passage of this kind will then be preferably formed by the space provided between two surfaces, close together and being surfaces of revolution about the axis of the apparatus. By virtue of this arrangement, the mean speed of propagation of the fluid and the loss of pressure in the passage remain very low, although the flow-rate in the passage has a substantial value.

It should be noted that the present invention contemplates the application of the measuring device, not only to torque converters, that is to say to hydro-kinetic transmission apparatus comprising, in addition to a pump and a turbine, at least one reactor arranged between the pump and the turbine, but also to all other hydro-kinetic transmission apparatus, for example to couplers which do not comprise a reactor.

The characteristic features and advantages of the invention will further be brought out from the description given below by way of example, reference being made to the accompanying drawings, in which:

FIG. 3 shows the application of the invention to a coupler;

FIG. 4 shows an alternative form of construction of the means for measuring the difference in pressure;

FIG. 5 illustrates a possible shape of guiding ribs formed on either of the closely-adjacent surfaces which define the collecting passages in the case where there exists a flow of fluid in the said passages;

FIG. 6 is a transverse section of one of these ribs, taken along the line VI—VI of FIG. 5;

FIGS. 7 and 8 illustrate alternative shapes of these guiding ribs;

FIGS. 9, 10 and 11 illustrate various possible shapes of the collecting passages in the case where these passages are constituted by separate series of tubes;

FIG. 12 is a diagram representing the variations of the ratio of the difference in measured pressure and the output torque of the converter, as a function of the ratio of the speeds of the driven shaft and of the driving shaft;

Figure 1:
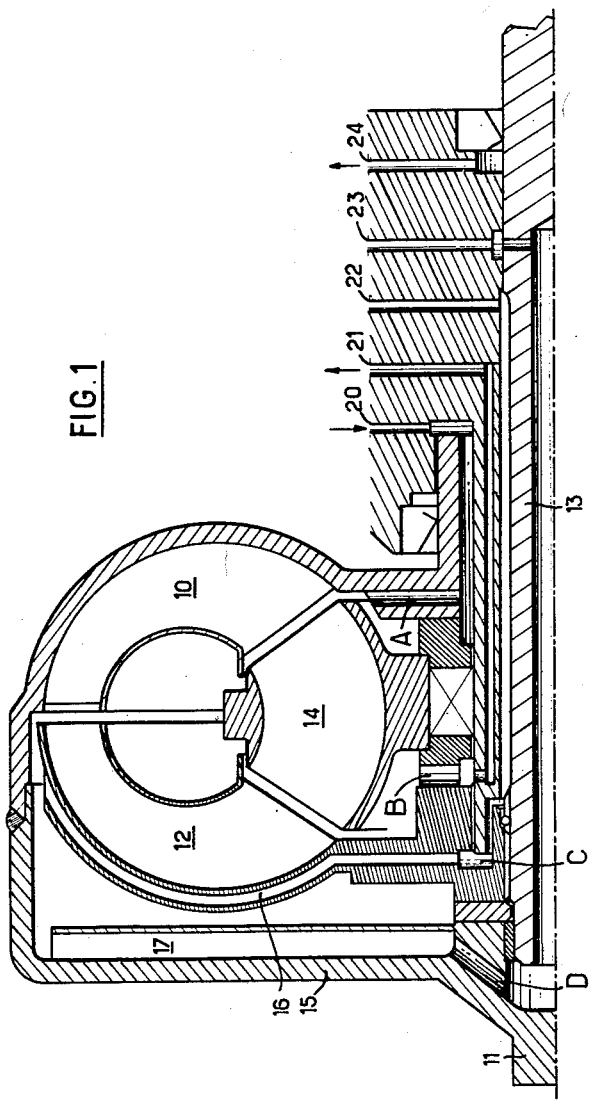
FIG. 1 is a half axial section of a torque converter provided with pressure collecting passages in accordance with a first embodiment of the invention.

The converter shown in FIG. 1 comprises in known manner, a pump 10 coupled to a driving shaft 11, a turbine 12 coupled to a driven shaft 13, and also a reactor 14 arranged between a pump 10 and the turbine 12. The pump 10 is coupled to the driving shaft 11 by an endplate 15.

A pressure-collecting passage 16 is associated with the turbine 12 and extends from the central portion to the periphery of the casing of the converter. A second pressure-collecting passage 17 is associated with the endplate 15 and extends also from the central portion to the periphery of the casing.

The passages 16 and 17 may each be formed either by a series of tubes such as shown in FIGS. 9 to 11, or by the space formed between two surfaces closely adjacent, of which one may be provided with guiding ribs diverging from the centre towards the periphery, as shown in FIGS. 5 to 8.

There is shown at 20 a conduit which communicates with the central portion A of the pump; at 21, a conduit which communicates with the central portion B of the turbine; at 22, a conduit which communicates with the inner extremity C of the passage 16 associated with the turbine 12; at 23, a conduit which communicates with the extremity D of the passage 17 associated with the endplate 15; and at 24, a return conduit for the leakage.

The oil-renewal circuit of the converter can then be formed between the conduits 20 and 21, which become the supply and fluid return conduits, while the difference of pressure enabling the torque to be measured is taken from between the conduits 22 and 23, that is to say between the inner extremities C and D of the two passages 16 and 17, which are independent of the active circuit and of the oil renewal circuit of the converter, and in which the flow is nil or very small.

Under these conditions, it has been found that the ratio between the difference of pressure $\Delta P = P_C - P_D$ and the output torque, represented by $\Phi T$ varies as shown in FIG. 12 as a function of the ratio $i$ of the speeds T and P of the turbine and the pump. The curve in full lines shows the variations of $\Delta P$ when the passages 16 and 17 are each constituted by a series of radial tubes 25, such as shown in FIG. 9; the curve in broken lines represents the variations of $\Delta P$ when the passages 16 and 17 are constituted by a series of tubes 26, the outer extremities of which are inclined at an angle $\alpha = 30°$ towards the rear (see FIG. 11). It is found that $\Delta P/\Phi T$ remains very close to a mean value when $i$ varies from 0 to 1, and that it tends towards another value greater than the first, when $i$ becomes greater than 1.5. It can also be seen that the curve of the variations of $\Delta P/\Phi T$ can be modified by changing the shape of the pressure-collecting passages.

Figure 2:
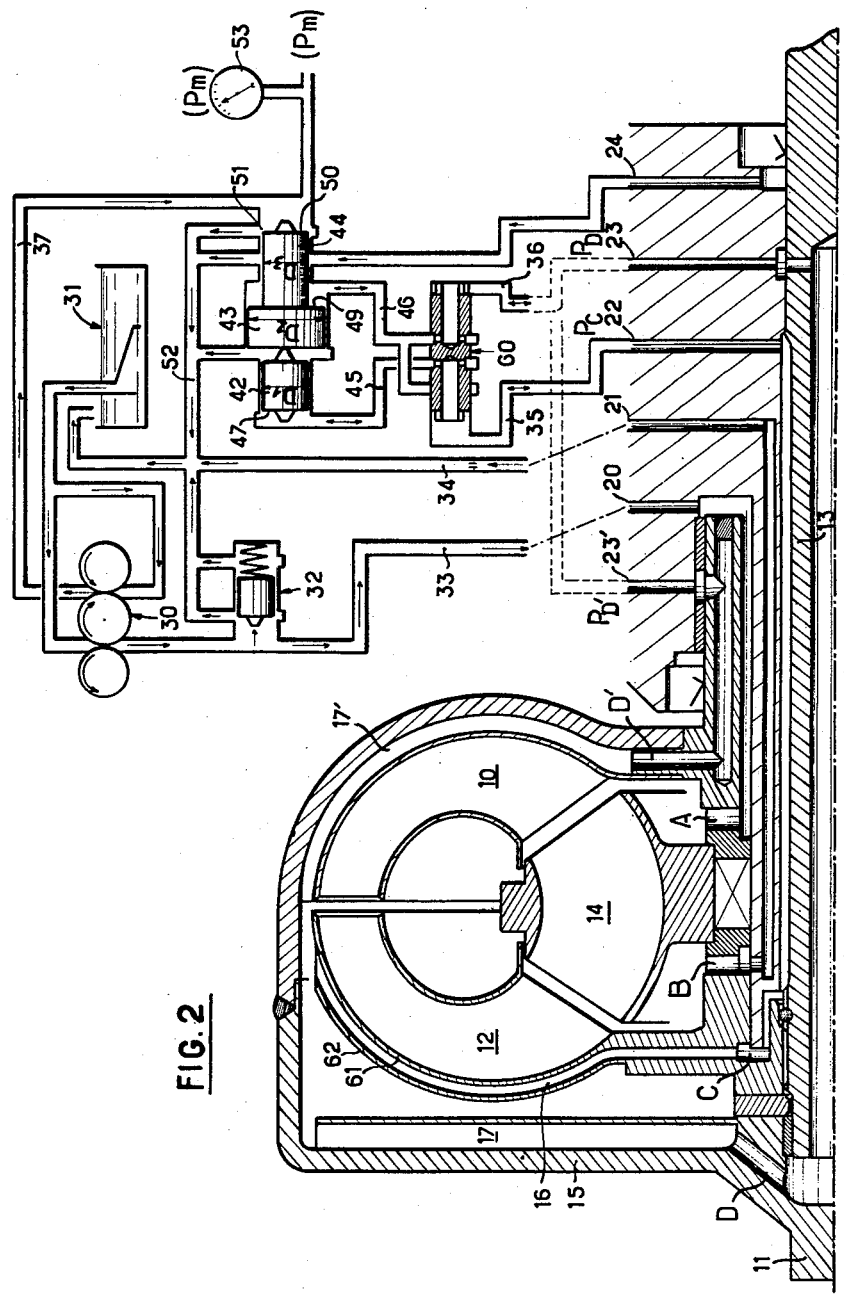
FIG. 2 is a general theoretical diagram of a device according to the invention, in which there has been shown, for the same converter, two separate types of collecting passages coupled to the pump, it being understood that one only of these types of passage will be selected in a practical form of construction.

In FIG. 2, which is a more general theoretical diagram of a device according to the invention, there has been shown on the converter, in addition to the passages 16 and 17 of FIG. 1, a further passage 17' formed in the body of the pump 10 and the inner extremity D' of which is coupled to a conduit 23'. This passage 17' which, like the passage 17, is coupled to the pump 10 and also extends from the central portion to the periphery of the chamber, can play practically the same part as the passage 17.

In FIG. 2, there has also been shown the means for measuring the difference of pressure, together with the hydraulic fluid supply members.

There has been indicated at 30 a pumping set; at 31, the tank from which this pumping set draws the fluid; at 33, a first outlet of the pumping set; at 32, a regulation valve for the pressure at the outlet 33; at 34, a return conduit to the tank 31; at 37, a second outlet of the pumping set 30.

The means for measuring the difference of pressure $P_C - P_D$ (or $P_C - P_D'$) comprise a moving system constituted by two sliding members 42 and 43, the member 43 having a portion 44 of reduced diameter. One of the measurement pressures is applied through a conduit 45 to the face 47 of the member 42; the other measurement pressure is applied to a conduit 46 to the annular face 49 of the member 43. The diameter $D_1$ of the member 42 is preferably chosen in such manner that $D_1^2 = D_2^2 - D_3^2$, $D_2$ and $D_3$ representing respectively the diameters of the two cylindrical portions of the member 43. On the face 50 of the portion 44, there exists a pressure $P_m$ which depends in particular on the amount of the loss of pressure at 51 towards the leakage collector 52, which loss of pressure varies with the position of the member 43. This pressure $P_m$ is recorded by a pressure gauge 53.

In the position of equilibrium, the pressure $P_m$ is related to the pressures $P_{45}$ and $P_{46}$ (existing respectively in the conduits 45 and 46) by the equation of equilibrium:

$$\frac{\pi}{4} D_3^2 P_m = \frac{\pi}{4} D_1^2 P_{45} - \frac{\pi}{4} (D_2^2 - D_3^2) P_{46}$$

that is to say, in the preferred solution:

$$D_3^2 P_m = D_1^2 (P_{45} - P_{46})$$

The pressure $P_m$ is thus proportional to the difference between the pressures in the conduits 45 and 46, or is even equal to that difference if $D_3 = D_1$, as shown in the figure.

It will be noted that, for certain applications, it may be desired to measure and to actually employ a pressure $P_m = KP_{45} - K'P_{46}$. It will then be necessary to select $D_1^2$ different from $D_2^2 - D_3^2$.

The measurement pressures $P_C$ and $P_D$ (or $P_D'$) are applied to the conduits 45 and 46 through the intermediary of a flow-reversing device 60, constituted by a piston which can slide freely between two positions.

When the pressure $P_C$ in the conduit 22 is higher than the pressure $P_D$ (or $P_D'$) in the conduit 23 (or 23'), that is to say when $i$ is less than 1 (see FIG. 12), the flow-reverser 60 is in the position of FIG. 2, that is to say it connects the conduit 22 to the conduit 45, and the conduit 23 (or 23') to the conduit 36. Under these conditions the pressure gauge 53 measures $P_m = P_C - P_D$ (or $P_C - P_D'$).

When on the contrary $P_D$ (or $P_D'$) becomes greater than $P_C$, that is to say when $i$ becomes greater than 1, the flow-reverser 60 slides as a result of the increase of pressure in the conduit 23 and connects the conduits 22 to the conduit 46, and the conduit 23 (or 23') on the conduit 45, the pressure gauge 53 then measures $P_m = P_D - P_C$ (or $P_D' - P_C$).

There is thus obtained a continuous measurement irrespective of the sign of the output torque of the converter and of $\Delta P$. It will be observed that $\Delta P/\Phi T$ is always positive since a simultaneous inversion of sign takes place on $\Delta P$ and on $\Phi T$.

Some alternative forms of construction of the invention will now be indicated with reference to FIG. 2.

It has already been observed that the invention essentially provides, with the object of increasing the accuracy of measurement, for picking-up the measurement pressures from the inner extremities of the passages 16 and 17 (or 17') in which the linear speed of propagation of the fluid and the corresponding loss of pressure are small or nil. It has been previously indicated that for this purpose it is possible to consider choosing these passages outside any circulation circuit of fluid in the apparatus, so that the flow and the loss of pressure in these passages may be nil. However, it is also possible to provide for one and/or the other of these passages forming part of the oil-renewal circuit of the apparatus.

There is therefore a large number of possible connections between the conduits 33, 34, 35 and 36 on the one hand, and on the other hand between the conduits 20, 21, 22, 23 and 23'. Some of these connections have been indicated by way of example in the table below, which also provides for the case of the coupler shown in FIG. 3 (in which those parts similar to the parts of FIGS. 1 and 2 have been given the same references).

|  | 33 | 34 | 35 | 36 |
|---|---|---|---|---|
| RENEWAL CIRCUIT PASSING IN THE ACTIVE CIRCUIT |  |  |  |  |
| I—Both passages without flow of fluid (valid for converter and coupler) | 20 / 20 | 21 / 21 | 22 / 22 | 23 / 23' |
| II—One passage only with flow of fluid: |  |  |  |  |
| Case of the converter alone | 23' / 23 / 22 | 21 / 21 / 21 | 22 / 22 / 22 | 23' / 23 / 23 |
| And one passage without flow: |  |  |  |  |
| For coupler and converter | 20 / 20 / 20 | 23' / 22 / 23 | 22 / 22 / 22 | 23' / 23' / 23 |
| RENEWAL CIRCUIT NOT PASSING IN THE ACTIVE CIRCUIT |  |  |  |  |
| III—Two passages with flow | 23' / 23 / 22 | 22 / 22 / 23' | 22 / 22 / 22 | '23 / 23 / 23' |
| (Valid for converter and coupler) | 22 | 23 | 22 | 23 |

It will be understood that the case described above with reference to FIG. 1 corresponds to the first line of the group of this table (both passages without flow of fluid).

It will be noted that whenever a pressure-collecting passage forms part of the oil-renewal circuit of the apparatus, this passage is preferably constituted by the space formed between two surfaces close together and being bodies of revolution about the axis of the apparatus. The mean speed of propagation of the fluid in the passage and the corresponding loss of pressure thus remain very small, although the rate of flow has a substantial value. It may be imagined, for example, that for the case of the first line of the group III of the table, the passage 16 is formed between two adjacent surfaces represented at 61 and 62 in FIG. 2. Either of these surfaces can be provided with guiding ribs 63 which may be radial (FIG. 5), or alternatively of arcuate form (FIGS. 7 and 8), the outer portion of which is inclined at an angle $\alpha$ to a plane passing through the axis, with a view to the eventual correction of the form of the variations of $\Delta P \Phi T$ as a function of $i$.

An alternative form of construction of the measuring means will now be described with reference to FIG. 4, which is intended to confer a greater ease of use of the quantity measured $P_m$.

It should be observed that with the arrangement of FIG. 2, the measured pressure $P_m$ becomes zero at the moment when $i$ becomes equal to 1. Now, there will generally be an advantage in maintaining in all cases a minimum value for the pressure $P_m$. To this end, there is added to the device a valve 70 which ensures a minimum value $p$ for the pressure existing on the face 50 of the member 44. This arrangement eliminates all variation of the measured pressure over a range of values of torque on each side of zero, and which can be fixed for each particular case at a value which is a function of the dimensions of the apparatus and also of the threshold of sensitivity from which it is advantageous to know the variations of the torque transmitted by the apparatus.

The invention is obviously not limited to the forms of construction described above, which have only been given by way of example, but which may, on the contrary, form the object of various alternative constructions within the scope of the invention.

In particular, it will be noted that in the case where the tubes 26 or alternatively the guiding ribs 63 comprise an outer portion inclined to a plane passing through the axis, the measurement obtained is a function of the angular accelerations. If it is desired to annul, modify or even reverse these effects of angular accelerations, there can be provided in each tube or rib of this kind, an intermediate portion 80 inclined to a radial plane in the sense opposite to the direction of inclination of the external portion (see FIGS. 7 and 10).

Figure 13:
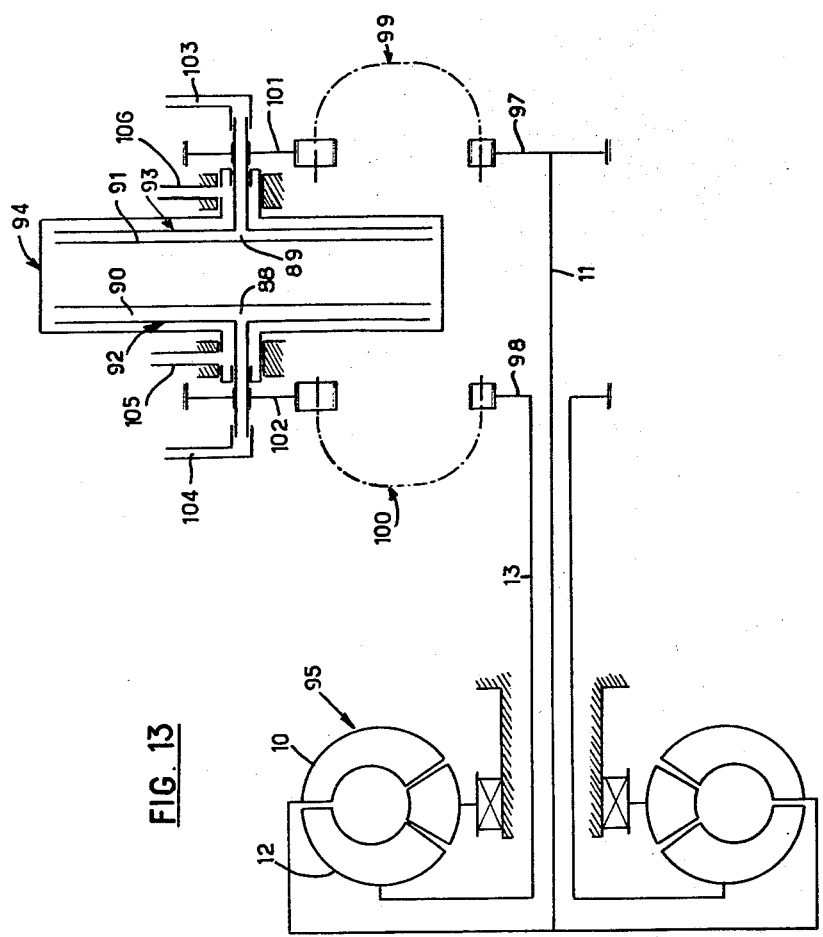
FIG. 13 is a diagram illustrating a general form of the invention.

It is also possible to contemplate, in accordance with FIG. 13, the measurement of the difference of pressure between the inner extremities 88 and 89 of two collecting passages 90 and 91 coupled respectively to two centrifugal members 92 and 93, arranged in a chamber 94 totally filled with oil, separate from the casing of the hydro-kinetic apparatus 95, the said centrifugal members rotating respectively at speeds proportional to those of the turbine 12 and the pump 10 of the hydro-kinetic apparatus. The oil supply circuit is diagrammatically shown by a supply conduit 105 and an outlet conduit 106. The ratio of proportionality is the same between the speeds of the pump 10 and the member 93 on the one hand, and of the turbine 12 and the member 92 on the other. To this end, the driving shaft 11 and the driven shaft 13 are provided respectively with toothed wheels 97 and 98 which, by means of similar transmissions 99 and 100, communicate the movement to two wheels 101 and 102 respectively fixed to the centrifugal members 93 and 92. The conduits 103 and 104, coupled to the inner extremities 89 and 88 of the passages 91 and 90, are connected to an instrument for measuring the difference of pressure.

It will be observed that in certain cases there may be an advantage in adopting slightly different transmissions 99 and 100, in order that the ratios of proportionality between the speeds of the pump 10 and the member 93 on the one hand, and of the turbine 12 and the member 92 on the other, may in turn be slightly different, for the purpose of modifying certain parts of the curve of variations of $\Delta P/\Phi T$ as a function of $i$. It will therefore be seen that the load applied to the output of a hydrokinetic transmission apparatus is conveniently measured according to the present invention in terms of the pressure difference between points A and B in the fluid circuit of the transmission apparatus, as seen in FIG. 2. This pressure difference varies as a function of the slip in the torque converter. However, the ratio between this pressure difference and the load applied to the output remains substantially constant as the ratio between the turbine rotational speed and the impeller rotational speed varies from zero to unity (see FIG. 12).

It will therefore be appreciated that means for measuring the difference between the pressures detected at the inner extremities of the passages coupled to the centrifugal members, that is, the pressure differences of FIG. 12, provides in fact a precise indication of the load applied to the output of the hydrokinetic transmission apparatus, that is, the output torque $\phi T$ of FIG. 12, as the ratio $\Delta P:\phi T$ is substantially constant.

What I claim is:

1. A device for measuring the load applied to the output of a hydro-kinetic transmission apparatus, which comprises a pump coupled to a driving shaft and a turbine coupled to a driven shaft, said device comprising a chamber provided in its central portion with an orifice for the introduction of a hydraulic fluid under pressure together with an evacuation orifice for said fluid, and which comprises two centrifugal members having speeds respectively equal or proportional, with the same ratio of proportionality, to the speeds of the driving shaft and the driven shaft, at least one passage coupled to the first centrifugal member and at least one passage coupled to the second centrifugal member, each of said passages extending between the central portion and the periphery of said chamber, together with means for measuring the difference between the pressures collected respectively at the inner extremities of said passages coupled to the centrifugal members.

2. A device as claimed in claim 1, in which both of said passages are arranged so that the mean linear speed of propagation of the fluid in said passages together with the loss of pressure which may result, are small or nil.

3. A device as claimed in claim 1, applied to a hydro-kinetic transmission apparatus in which the outlet of the pump and inlet of the turbine are located in the vicinity of the periphery of the apparatus, said chamber being constituted by the actual casing of the apparatus, the centrifugal member rotating with the driving shaft being constituted by the actual pump of the apparatus, the centrifugal member rotating with the driven shaft being constituted by the actual turbine of the apparatus, while the pressure-collecting passages are both independent of the active circuit of said hydro-kinetic transmission apparatus.

4. A device as claimed in claim 3, in which said pressure-collecting passages are both independent of any fluid-circulation circuit in said hydro-kinetic transmission apparatus, that is to say the rate of flow of fluid and loss of pressure in said passages are zero.

5. A device as claimed in claim 3, in which at least one of said pressure-collecting passages is constituted by a bundle of separate tubes passing from the central portion to the periphery of the apparatus.

6. A device as claimed in claim 5, in which said tubes are arranged in radial planes.

7. A device as claimed in claim 5, in which the outer portion of said tubes is inclined on a radial plane.

8. A device as claimed in claim 7, in which said inclined outer portion is coupled to the inner portion of said tubes by an intermediate part, the shape of which is chosen so as to annul, modify or reverse the effects of angular acceleration.

9. A device as claimed in claim 8, in which said intermediate part is inclined on a radial plane in a direction opposite to the direction of inclination of the outer portion.

10. A device as claimed in claim 3, in which at least one of said pressure-collecting passages forms part of the renewal circuit of the hydraulic fluid in the apparatus, and is then constituted by the space formed between two surfaces of revolution about the axis of the apparatus and disposed in relation to each other in such manner that the loss of pressure remains negligible in spite of the flow of fluid.

11. A device as claimed in claim 10, in which one of said two surfaces is provided with guiding ribs proceeding from the central portion to the periphery of said surface.

12. A device as claimed in claim 11, in which said ribs are arranged in radial planes.

13. A device as claimed in claim 11, in which said outer part of the ribs is inclined on a radial plane.

14. A device as claimed in claim 13, in which said inclined outer portion is coupled to the inner portion of said ribs by an intermediate part, the shape of which is chosen, so as to annul, modify or reverse the effects of angular acceleration.

15. A device as claimed in claim 14, in which said intermediate part is inclined on a radial plane in the opposite direction to the direction of inclination of the outer portion.

16. A device as claimed in claim 3, in which the means for measuring the difference between the collected pressures comprise a reversing switching device sensitive to said pressures and adapted to direct the highest pressure always to the same side of a moving system which permits the production of a pressure varying with the torque of said hydro-kinetic transmission apparatus and capable of being measured and utilized.

17. A device as claimed in claim 16, in which said reversing switching device is constituted by a piston adapted to slide between two positions in a cylinder and having internal conduits which establish, for each of said positions, communications between the faces of the piston and conduits opening laterally into said cylinder.

18. A device as claimed in claim 16, in which one of the sides of said moving system is subjected to a threshold pressure with the object of preventing the indication of said measuring means from passing to zero.

References Cited in the file of this patent

UNITED STATES PATENTS

| | | |
|---|---|---|
| 2,387,901 | Haverstick | Oct. 30, 1945 |
| 2,398,167 | Walker | Apr. 9, 1946 |
| 2,975,633 | Hautzenroeder | Mar. 21, 1961 |

FOREIGN PATENTS

| | | |
|---|---|---|
| 206,377 | Australia | Nov. 10, 1955 |